United States Patent [19]

Wendt et al.

[11] Patent Number: 4,963,050

[45] Date of Patent: Oct. 16, 1990

[54] SPRING CLIP CABLE SUPPORT ASSEMBLY

[75] Inventors: Robert O. Wendt, Adrian; Steven T. Holt, Clayton; Gordon L. Schneider, Westland, all of Mich.

[73] Assignee: Babcock Industries Inc., Fairfield, Conn.

[21] Appl. No.: 324,308

[22] Filed: Mar. 16, 1989

[51] Int. Cl.$^5$ .............................................. F16D 9/00
[52] U.S. Cl. ................................... 403/197; 74/502.4
[58] Field of Search ................ 248/56; 403/194, 195, 403/197, 252; 74/501.5 R, 502.4; 285/205, 206, 207, 208, 209, 210, 298

[56] References Cited

U.S. PATENT DOCUMENTS

| 2,869,905 | 1/1959 | Bratz | 74/502.4 |
| 3,221,572 | 12/1965 | Swick | 74/502.4 |
| 3,366,405 | 1/1968 | Sevrence | 74/502.4 |
| 4,131,379 | 12/1978 | Gordy | 74/502.4 |
| 4,324,503 | 4/1982 | Sevrence | 74/502.4 |
| 4,621,937 | 11/1986 | Maccuaig | 74/502.4 |

Primary Examiner—Ramon O. Ramirez
Assistant Examiner—Robert A. Olson
Attorney, Agent, or Firm—Barnes, Kisselle, Raisch, Choate, Whittemore & Hulbert

[57] ABSTRACT

A spring clip cable support assembly for use with a cable comprising of an outer conduit and an inner flexible strand extending through the conduit comprising an inner tubular body having an opening therethrough and a radial flange thereon, a tubular spring clip pressed about a portion of the body, a collar extending about a portion of the spring clip and having a first end engaging the radial flange and second end adapted to engage one side of a support. The spring clip includes spring fingers adapted to engage the other side of the support. The lengths of the contacting portions of body and the spring clip are such that the free edge of the spring clip is spaced from the radial flange and is adapted to be positioned in a plurality of longitudinal positions during assembly to accommodate supports of different thickness. During assembly a spacer of the desired thickness corresponding to that of the intended support is interposed between the second end of the collar and ends of the spring fingers and the collar spring clip and body are interconnected in the desired position as by staking.

6 Claims, 1 Drawing Sheet

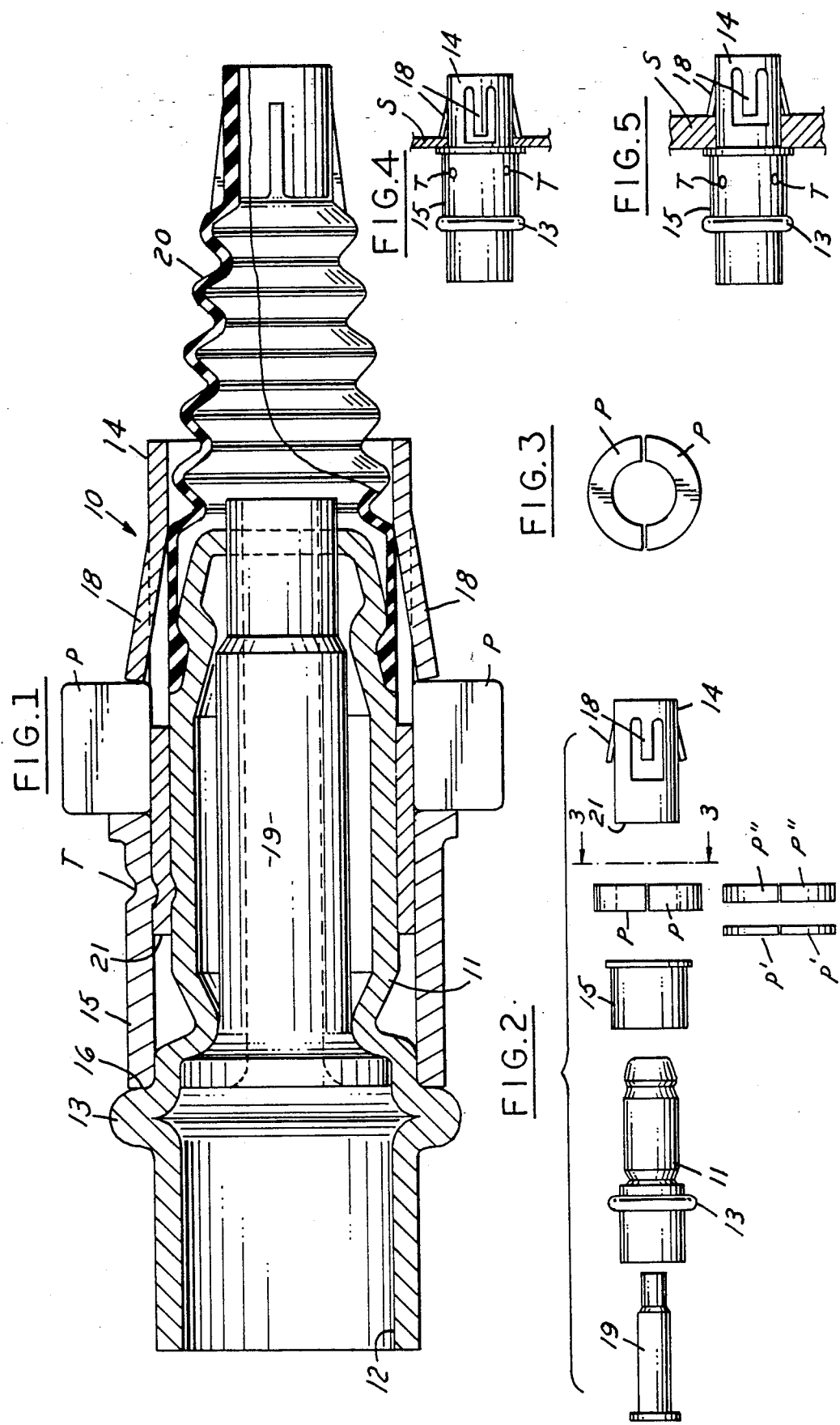

SPRING CLIP CABLE SUPPORT ASSEMBLY

This invention relates to spring clip cable support assembly.

BACKGROUND AND SUMMARY OF THE INVENTION

In cable controls of the type which include an outer conduit and inner strand extending through the conduit, it has been common to provide spring clip assemblies for supporting the conduit along the cable control.

A common type of a spring clip assembly comprises an inner body, a tubular spring clip pressed over the body and having a free end adapted to engage a flange on the body and collar telescoped over the spring clip assembly. The collar also engages the flange of the body. The body, spring clip and collar are fastened to one another and the other end of the collar is adapted to engage one side of the support while spring fingers on the spring clip are adapted to engage the other side of a support. Such a clip assembly is shown in U.S. Pat. No. 4,621,937.

One of the problems with respect to such of a construction is that separate size spring clips must be maintained in inventory and must be readily manufactured to provide spring clip assemblies to accommodate different supports having different wall thicknesses.

Among the objectives of the present invention are to provide a construction and method of assembly that obviates the need for larger inventories and utilizes spring clips of identical construction for each of different sizes of spring clip assemblies.

In accordance with the invention, the spring clip cable support assembly comprises an inner tubular body having an opening therethrough and a radial flange thereon, a tubular spring clip pressed about a portion of the body, a collar extending about a portion of the spring clip and having a first end engaging the radial flange and second end adapted to engage one side of a support. The spring clip includes spring fingers adapted to engage the other side of the support. The lengths or the contacting portions of body and the spring clip are such that the free edge of the spring clip is spaced from the radial flange and is adapted to be positioned in a plurality of longitudinal positions during assembly to accommodate supports of different thickness. During assembly, a spacer of the desired thickness corresponding to that of the intended support is interposed between the second end of the collar and ends of the spring fingers and the collar spring clip and body are interconnected in the desired position as by staking.

DESCRIPTION OF THE DRAWINGS

FIG. 1 is a longitudinal sectional view of a spring clip assembly embodying the invention.

FIG. 2 is a exploded view of the spring clip assembly including spacers utilized in the assembly thereof.

FIG. 3 is a view taken along the line 3—3 in FIG. 2.

FIG. 4 is a part sectional view showing the spring clip assembly assembled in a manner to accommodate relatively a thin support.

FIG. 5 is a part sectional view of the spring clip assembly assembled to accommodate a thicker support.

DESCRIPTION

A common type of a spring clip assembly comprises an inner body, a tubular spring clip pressed over the body and having a free end adapted to engage a flange on the body and collar telescoped over the spring clip assembly. The collar also engages the flange of the body. The body, spring clip and collar are fastened to one another and the other end of the collar is adapted to engage one side of the support while spring fingers on the spring clip are adapted to engage another side of a support. A typical spring assembly is shown in U.S. Pat. No. 4,621,937.

In accordance with the invention, the spring clip cable support assembly 10 for use with a cable having an outer conduit and an inner flexible strand extending through the conduit comprising of an inner tubular body 11 having an opening 12 therethrough and a radial flange thereon, a tubular spring clip 14 pressed about a portion of the body 11, a collar 15 extending about a portion of the spring clip 14 and having a first end 16 engaging radial flange 13 and second end 17 adapted to engage a support S on a vehicle or the like (FIGS. 4, 5). The spring clip 14 includes spring fingers 18 adapted to engage the other side of the supports. An inner seal member 19 and an outer sealed member 20 are provided, as shown in U.S. Pat. No. 4,621,937 which is incorporated herein by reference.

In accordance with the invention the length of the contacting portions of body 11 and the spring clip 14 are such that the free edge 21 of the spring clip 14 is spaced from the radial flange 13 of body 11 and is adapted to be positioned in a plurality of longitudinal positions relative to body 11 during assembly to accommodate supports of different thickness.

During assembly, a spacer P of the desired thickness corresponding to that of the intended support is interposed between the second end of the collar 15 and ends of the spring fingers 18. The collar 15, spring clip 14 and body 11 are interconnected in the desired position as by staking at circumferentially spaced points or areas T.

The spacers P preferably comprise two semicylindrical pieces that are moved radially inwardly between the collar 15 and fingers 18 into contact with the body 11. The spring clip 14 is then moved axially to bring the fingers 18 into contact with the spacer P. The staking at T is then performed and the spacers P are removed. If it is desired to make a spring assembly for mounting on a thinner support, spacers P' or P" can be used.

Thus, it is possible to make spring assemblies from the same parts to accommodate supports of different thicknesses.

It can thus be seen that there has been provided a construction and method of assembly that obviates the need for larger inventories and utilizes spring clips of identical construction for each of different sizes of spring clip assemblies.

We claim:

1. The method of assembling a clip cable support assembly for use with a cable comprising an outer conduit and an inner flexible strand extending through the conduit comprising an inner tubular body having a contacting portion and having an opening therethrough and a radial flange thereon, a tubular spring clip having a free edge and pressed about a portion of the body, a collar having ends extending about a portion of the spring clip and having a first end engaging said radial flange and second end adapted to engage a support, said spring clip including spring fingers adapted to engage the other side of the support, said method comprising forming the length of the contacting portions of body in the spring clip such that the free edge of the spring clip is spaced from the radial flange and is adapted to be positioned in a plurality of longitudinal positions during assembly to accommodate supports of different thickness, positioning a spacer of the desired thickness corresponding to that of the intended support on which the spring assembly is to be mounted between the other end of the collar and ends of the spring fingers, moving the spring clip and the collar axially toward one another to bring the collar and fingers into contact with the spacer, and interconnecting the collar, spring clip, and body.

2. The method set forth in claim 1 wherein said method of interconnecting said spring clip and body comprises staking.

3. The method set forth in claim 1 wherein said step of interconnecting said spring clip and body comprises staking at circumferentially spaced points.

4. A spring clip cable support assembly for use with a cable comprising an outer conduit for receiving an inner flexible strand extending through the conduit, an inner tubular body having a contacting portion and having an opening therethrough, an integral radial flange thereon intermediate its ends, a tubular spring clip having a free edge pressed about said contacting portion of said body, a tubular collar extending about a portion of the spring clip and having a first end engaging said radial flange and second end adapted to engage a support, said spring clip including spring fingers adapted to engage the other side of the support, the length of the contacting portions of body and the spring clip being such that the free edge of the spring clip being spaced from the radial flange, the spring clip adapted to be positioned in a plurality of longitudinal positions during assembly to accommodate supports of different thickness, and staking means interconnecting said collar.

5. The spring clip cable support assembly set forth in claim 4 wherein said staking means comprises circumferentially spaced deformations.

6. The method of assembling a clip cable support assembly for use with a cable comprising providing an outer conduit, providing an inner tubular body having a contacting portion and having an opening therethrough and an integral radial flange thereon, providing a tubular spring clip having a free edge and pressed about said contacting portion of the body, said spring clip including spring fingers adapted to engage the other side of the support, said method providing a collar having ends extending about a portion of the spring clip, positioning said collar such that a first end engages said radial flange and a second end is adapted to engage a support, forming the length of the contacting portions of body on the spring clip and positioning said spring clip such that the free edge of the spring clip is spaced from the radial flange and is adapted to be positioned in a plurality of longitudinal positions during assembly to accommodate supports of different thickness, positioning a spacer of the desired thickness corresponding to that of the intended support on which the spring assembly is to be mounted between the other end of the collar and ends of the spring fingers, moving the spring clip and the collar axially toward one another to bring the collar and fingers into contact with the spacer, thereafter interconnecting the body, spring clip, and collar after the body, spring clip and collar are assembled, and removing said spacer.

* * * * *